United States Patent [19]

Miller

[11] 4,238,783
[45] Dec. 9, 1980

[54] TELEMETRY SYSTEM FOR TRANSMITTING ANALOG DATA OVER A TELEPHONE LINE

[75] Inventor: Roland G. Miller, New Milford, Conn.

[73] Assignee: Acco Industries, Inc., Trumbull, Conn.

[21] Appl. No.: 915,714

[22] Filed: Jun. 15, 1978

[51] Int. Cl.³ ............................................. H04B 13/00
[52] U.S. Cl. ............................... 340/870.26; 340/533; 340/658; 375/48; 455/112; 455/216
[58] Field of Search ............... 340/531, 533, 534, 658, 340/171 R, 172, 207 R, 347 AD, 347 DA; 325/113, 139, 145, 146, 149, 153, 163, 315, 320, 351, 430, 30; 455/110, 112, 216, 313; 375/45, 48, 80

[56] References Cited

U.S. PATENT DOCUMENTS

| | | | |
|---|---|---|---|
| 3,406,383 | 10/1968 | McFarlane | 340/207 R |
| 3,603,881 | 9/1971 | Thornton | 325/30 |
| 3,626,417 | 12/1971 | Gilbert | 325/26 |
| 3,636,454 | 1/1972 | Pasternack et al. | 325/320 |
| 3,667,046 | 5/1972 | Schoolcraft | 325/163 |
| 3,919,642 | 11/1975 | Allen | 325/113 |

Primary Examiner—Alvin H. Waring
Attorney, Agent, or Firm—Pennie & Edmonds

[57] ABSTRACT

An FSK receiver for a single channel analog telemetry system comprises an FSK demodulator, a frequency multiplier, and a frequency-to-voltage converter. An FSK transmitter comprises a voltage-to-frequency converter, a frequency divider, and an FSK tone generator. The principal advantages of this system are greater speed due to faster settling time and reduced errors in accuracy and linearity.

9 Claims, 2 Drawing Figures

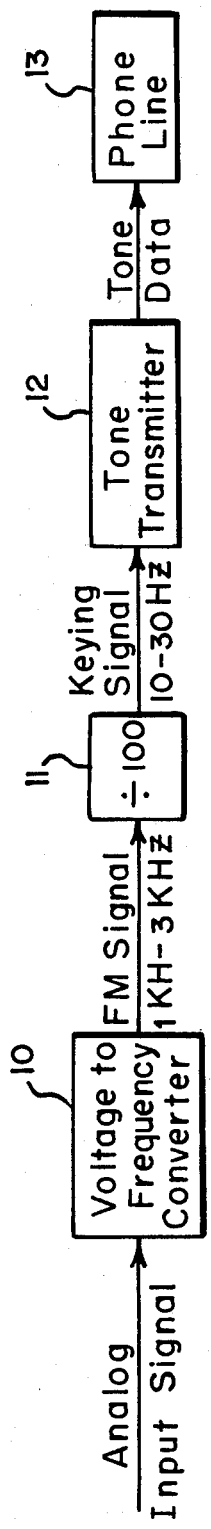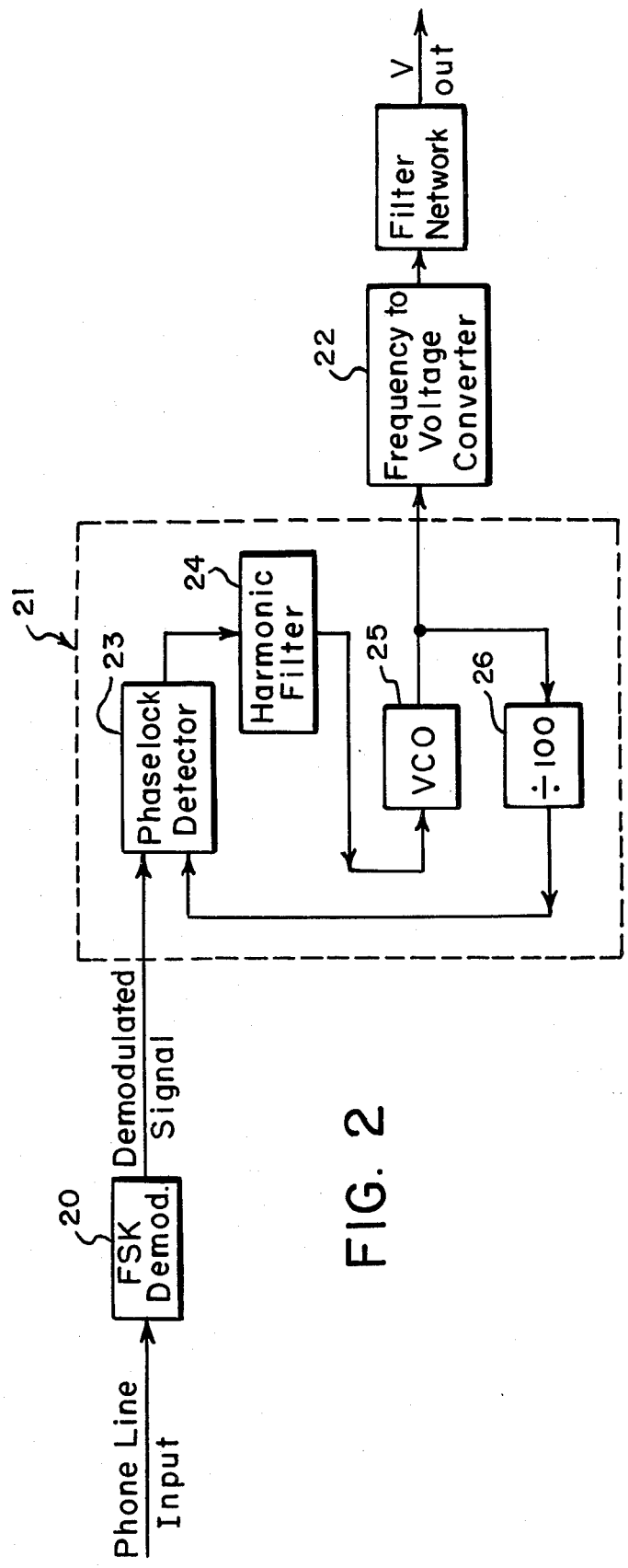
FIG. 1
FIG. 2

TELEMETRY SYSTEM FOR TRANSMITTING ANALOG DATA OVER A TELEPHONE LINE

BACKGROUND OF THE INVENTION

1. Field of the Invention

This invention relates to a telemetry system for transmitting analog data over a telephone line. In particular, it relates to a single channel analog telemetry system wherein an analog signal is converted to a frequency shift keyed transmission signal by way of an intermediate frequency modulated signal.

2. History of the Art

Telemetry systems for transmitting analog data over telephone lines are useful in a wide variety of applications. Such systems can be used in medicine, for example, to transmit vital medical information, such as an electrocardiogram and blood pressure to a remote medical center, and they can be used in industry to transmit process control information to a remote central process controller.

Because telephone lines introduce relatively high levels of spurious "noise" signals not properly part of the signals being transmitted, it is common practice in single channel analog telemetry systems to convert the information-containing direct current DC analog voltage or current signals to frequency shift keyed (FSK) transmission signals before transmission on the telephone lines. Typically a 0-10 volt DC signal is converted to a frequency modulated (FM) signal in the 10-30 Hertz range, and this low frequency FM signal is used to key an FSK tone transmitter which produces an FSK modulated signal for transmission over a telephone line to a remote receiver. These FSK signals— comprising modulated shifts from one discrete frequency to another—are considerably less subject to distortion by noise than are conventional AM or FM modulated signals. At the receiver, the FSK signal is demodulated to reproduce the low frequency FM signal which, in turn, is reconverted to a DC analog signal.

The thus described conventional systems suffer serious deficiencies in speed and accuracy. They are slow at the receiver and in reconstituting the analog value transmitted. This delay is due primarily to the time required to process and filter a 10-30 Hertz signal. Typically the receiver takes approximately two seconds to "settle" to approximately 98% of the analog value. This delay for each reading can be extremely expensive in control systems utilizing periodic computer monitoring and can be a source of error in metering. At the transmitter end, the system is also slow because of similar processing delays; and, in addition, is subject to errors in accuracy and linearity due to the small span of frequencies covering the range of analog values.

Accordingly, there is a need for a single channel analog telemetry system with a faster settling time at the receiver and greater linearity and accuracy at the transmitter.

SUMMARY OF THE INVENTION

In accordance with the present invention, an FSK receiver for a single channel analog telemetry system comprises an FSK demodulator, a frequency multiplier, and a frequency-to-amplitude converter. The FSK transmitter comprises a amplitude-to-frequency converter, a frequency divider, and an FSK tone generator. The principal advantages of this system are greater speed due to faster settling time and reduced errors in accuracy and linearity.

BRIEF DESCRIPTION OF THE DRAWINGS

The nature, advantages, and various features of the invention will appear more fully upon consideration of the illustrative embodiments now to be described in detail in connection with the accompanying drawings.

In the drawings:

FIG. 1 is a block diagram of an FSK transmitting system in accordance with the invention; and FIG. 2 is a block diagram of an FSK receiving system in accordance with the invention.

DETAILED DESCRIPTION OF THE DRAWINGS

Referring to the drawings, FIG. 1 schematically illustrates a system for transmitting analog data over a single telephone channel.

The FSK transmitting system comprises a frequency voltage-to-frequency converter 10 for converting the DC analog input signal (voltage or current) into an intermediate frequency modulated (FM) signal, a frequency divider 11 for dividing the intermediate frequency FM signal to the usual 10-30 Hertz range for keying a single standard 60 baud FSK channel; and an FSK tone transmitter 12, responsive to the divided frequency keying signal, for generating an FSK transmission signal to be transmitted over telephone line 13. In a preferred embodiment, the intermediate frequency FM signal is 100 times higher than the keying signal so that frequency divider 11 is a 1:100 divider.

The advantage of this transmitter is enhanced speed and accuracy. The analog signal, typically ranging from 0-10 volts DC, is distributed over a 1000 to 3000 Hertz frequency range which can be quickly processed and precisely digitally divided to the 10-30 Hertz range for FSK keying. The voltage-to-frequency converter, frequency divider, and FSK tone transmitter are all standard components available from numerous suppliers.

As shown in FIG. 2, the FSK receiving system preferably comprises an FSK demodulator 20, responsive to the transmitted FSK signal, for demodulating the FSK signal into the FM keying signal, a frequency multiplier 21 for multiplying the frequency of the keying signal to the intermediate frequency range, e.g., 1000 to 3000 Hertz, and a frequency-to-voltage converter 22 for converting the resulting intermediate frequency FM signal into an analog DC signal (voltage or current).

The preferred frequency multiplier for this receiver is a phase locked feedback loop comprising phase lock detector 23, harmonic filter 24, voltage controlled oscillator (VCO) 25, and frequency divider 26. The VCO is programmed with an output capability of 1000 Hertz to 3000 Hertz depending on the voltage of the phase lock detector. All components herein are standard items available from numerous suppliers.

In operation, demodulator 20 receives the FSK modulated signal from the telephone line and produces therefrom a 10-30 Hertz information-containing signal which is applied to the phase locked feedback loop via phase lock detector 23. The filtered output of detector 23 drives oscillator 25 whose output is divided by 100 and fed back to detector 23. Thus, the oscillator is driven by a comparison of the input signal from the demodulator and the divided oscillator output signal in such a manner as to tend toward zero error between the input and divided output signals.

The 1000–3000 oscillator output signal is also coupled to frequency-to-voltage converter 22 which quickly converts it to an information-containing voltage signal which, after suitable filtering to remove transients, provides an analog output signal corresponding to the transmitted analog input signal.

The advantage of this receiver is that with frequency multiplication, the time required for processing and filtering is substantially reduced with the consequence that settling time is reduced from the conventional period of about 2 seconds to approximately 200 milliseconds.

While the invention has been described in connection with only a small number of specific embodiments, it is to be understood that these are merely illustrative of the many other specific embodiments which can also utilize the principles of the invention. Thus, numerous and varied devices can be made by those skilled in the art without departing from the spirit and scope of the present invention.

I claim:

1. A receiving system for a single channel analog telemetry system comprising:

an FSK demodulator responsive to a transmitted FSK signal for producing therefrom a frequency modulated information-containing signal containing a range of frequencies;

a frequency multiplier responsive to the output of said FSK demodulator for multiplying the frequencies of said demodulator output to produce therefrom an intermediate frequency signal whose frequencies are higher than the frequencies of the demodulator output; and a frequency-to-amplitude converter responsive to the output of said frequency multiplier for producing an analog output signal.

2. A receiving system according to claim 1 wherein said frequency multiplier comprises a phase locked feedback loop.

3. A receiving system according to claim 1 wherein said frequency multiplier comprises:

a phase lock detector responsive to the output of said FSK demodulator for driving a voltage controlled oscillator;

a voltage controlled oscillator responsive to said phase lock detector for producing an intermediate frequency signal whose frequency is in a predetermined frequency range higher than the frequency range of the demodulator output; and a frequency divider responsive to the output of said voltage controlled oscillator for feeding back to the phaselock detector a divided intermediate frequency signal in such a manner as to tend toward zero error between the input to the detector and the divided oscillator output.

4. A transmitting system for a single channel analog telemetry system comprising:

an amplitude-to-frequency converter responsive to an analog input signal for generating in response thereto a modulated intermediate frequency FM signal containing a range of frequencies;

a frequency divider responsive to the output of said amplitude-to-frequency converter for dividing down the frequencies of said intermediate frequency signal to produce an FSK keying signal whose frequencies are lower than the frequencies of the amplitude-to-frequency converter output; and an FSK tone transmitter responsive to the output of said frequency divider for generating an FSK tone signal transmittable over a telephone line.

5. The receiving system of any one of claims 1, 2 or 3 wherein the frequency of said intermediate signal is approximately 100 times greater than the frequency of the demodulator output.

6. The transmitting system of claim 4 wherein the frequency of said lower frequency FSK keying signal is approximately 100 times smaller than that of said intermediate frequency signal.

7. A telemetry system comprising:

a amplitude-to-frequency converter responsive to a input signal for generating a modulated intermediate frequency FM signal in response thereto;

a frequency divider responsive to the output of said amplitude-to-frequency converter for dividing down said intermediate frequency signal to a lower frequency FSK keying signal;

an FSK tone transmitter responsive to the output of said frequency divider for generating an FSK tone signal transmittable over a telephone line;

an FSK demodulator responsive to a transmitted FSK signal for producing a frequency modulated information-containing signal therefrom;

a frequency multiplier responsive to the output of said FSK demodulator for producing therefrom an intermediate frequency signal whose frequency is higher than the frequency of the demodulator output; and a frequency-to-amplitude converter responsive to the output of said frequency multiplier for producing an analog output signal.

8. The telemetry system of claim 7 wherein said frequency multiplier comprises:

a phase lock detector responsive to the output of said FSK demodulator for driving a voltage controlled oscillator;

a voltage controlled oscillator responsive to said phase lock detector for producing an intermediate frequency signal whose frequency is in a predetermined frequency range higher than the frequency range of the demodulator output; and a frequency divider responsive to the output of said voltage controlled oscillator for feeding back to the phase lock detector a divided intermediate frequency signal in such a manner as to tend toward zero error between the input to the detector and the divided oscillator output.

9. The telemetry system of either claim 7 or claim 8 wherein said frequency divider divides down said intermediate frequency signal by a factor of about 100 and said frequency multiplier multiplies the frequency of the demodulator output by a factor of about 100.

* * * * *